No. 829,330. PATENTED AUG. 21, 1906.
J. M. GREENSHIELDS.
STUBBLE CUTTING ATTACHMENT.
APPLICATION FILED SEPT. 25, 1905.
3 SHEETS—SHEET 1.
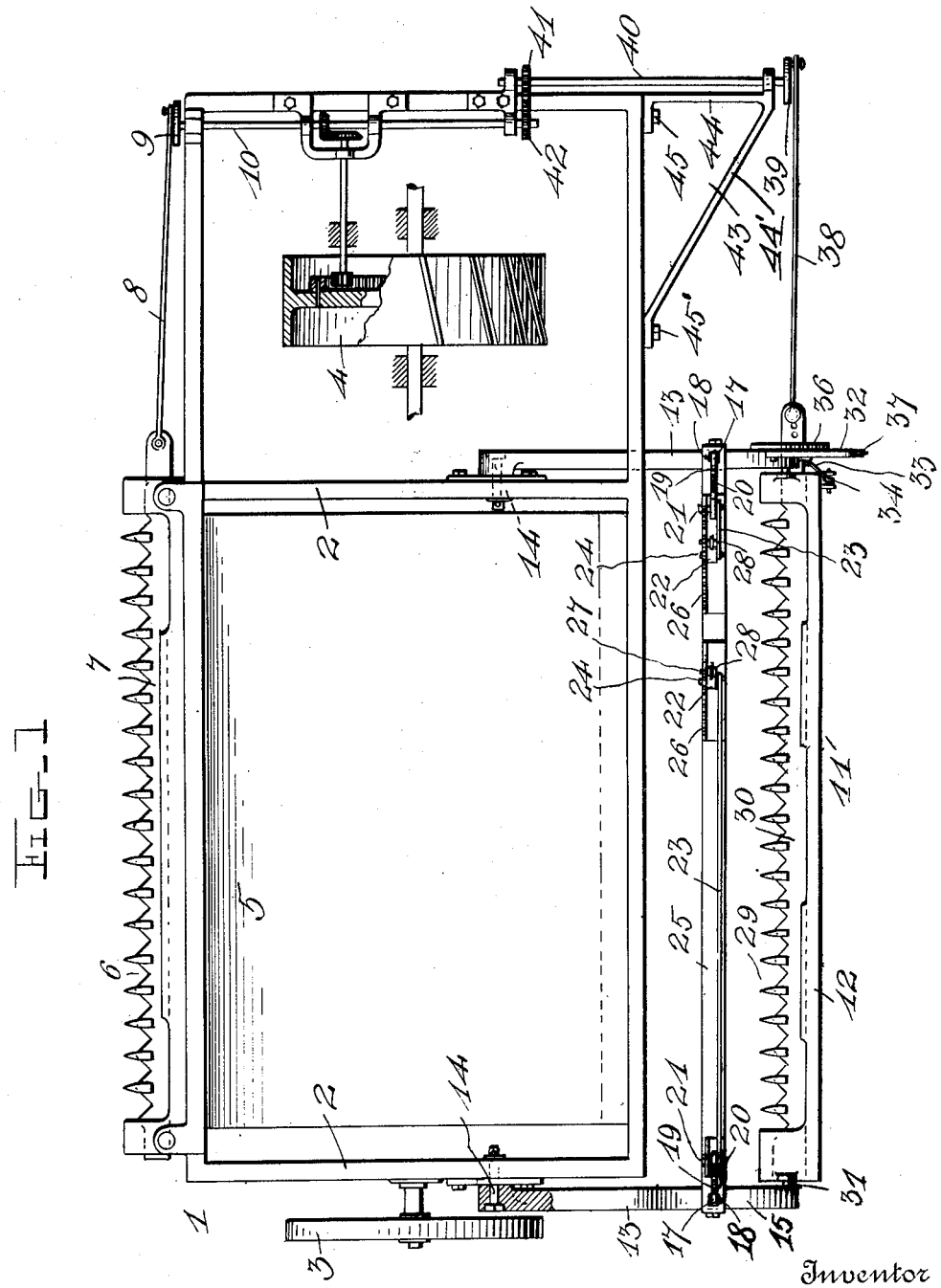
Witnesses
Inventor
James M. Greenshields
by H. R. Willson
Attorney No. 829,330. PATENTED AUG. 21, 1906.
J. M. GREENSHIELDS.
STUBBLE CUTTING ATTACHMENT.
APPLICATION FILED SEPT. 25, 1905.
3 SHEETS—SHEET 2.
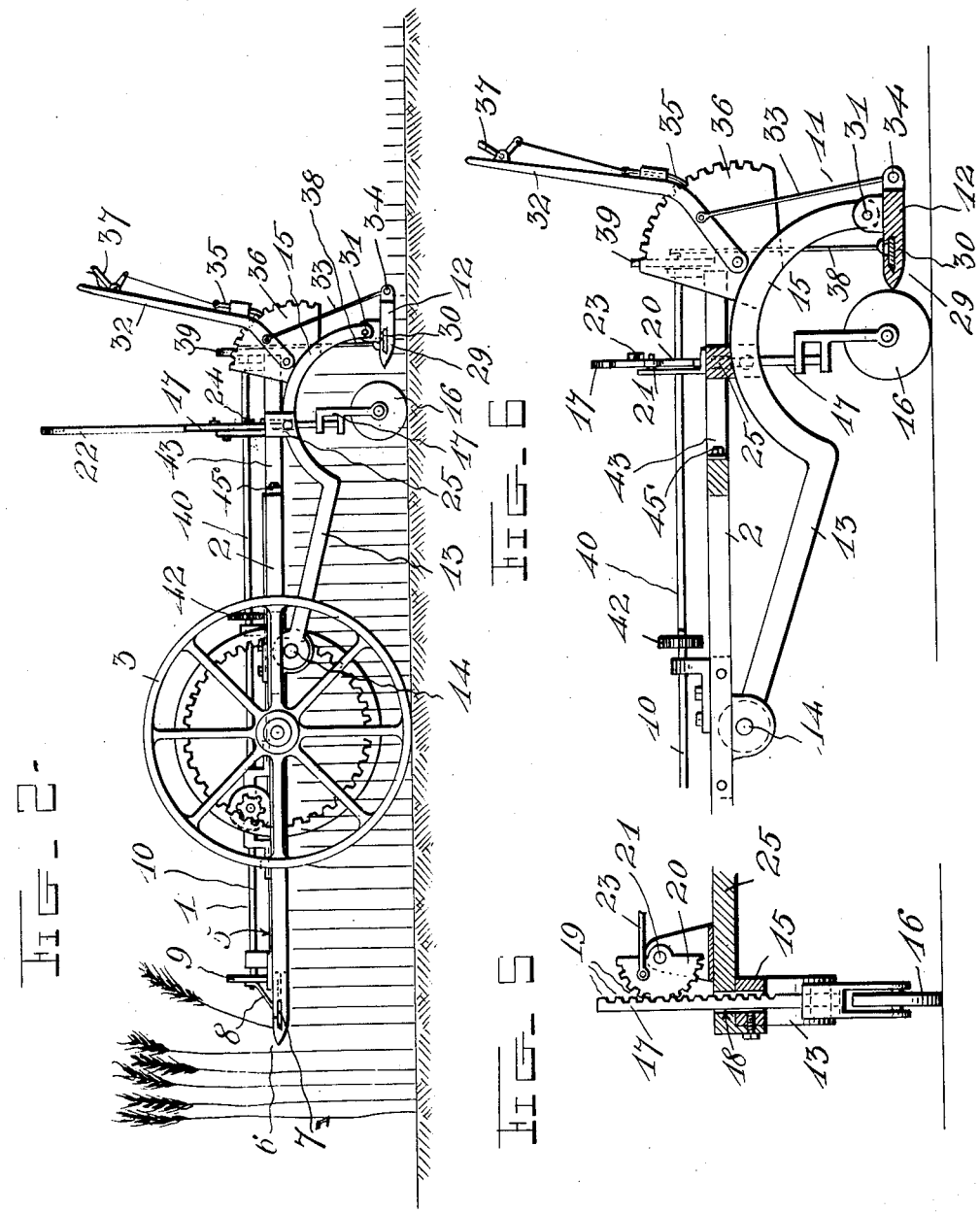
Witnesses
[signatures]
L. O. Hilton
Inventor
James M. Greenshields
by [signature]
Attorney

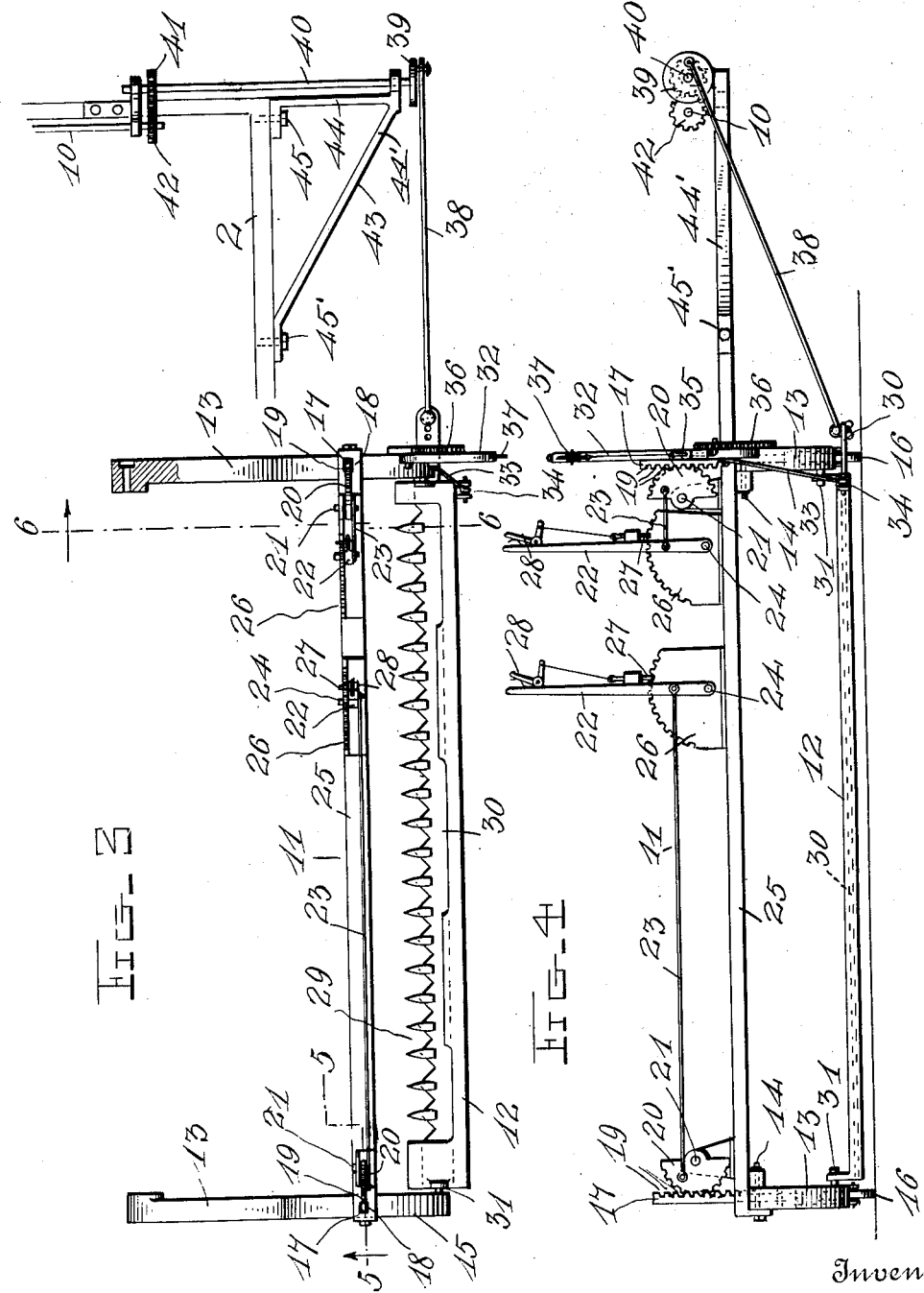

UNITED STATES PATENT OFFICE.

JAMES MALCOM GREENSHIELDS, OF BINSCARTH, CANADA.

STUBBLE-CUTTING ATTACHMENT.

No. 829,330.     Specification of Letters Patent.     Patented Aug. 21, 1906.

Application filed September 25, 1905. Serial No. 280,006.

*To all whom it may concern:*

Be it known that I, JAMES MALCOM GREENSHIELDS, a subject of the King of Great Britain, residing at Binscarth, in the Province of Manitoba and Dominion of Canada, have invented certain new and useful Improvements in Stubble-Cutting Attachments; and I do declare the following to be a full, clear, and exact description of the invention, such as will enable others skilled in the art to which it appertains to make and use the same.

My invention relates to improvements in machines for cutting stubble of wheat and other grain, and more particularly to a cutting device or attachment which may be applied to a self-binding reaper or any form of harvesting-machine.

The object of the invention is to provide a simple, durable, comparatively inexpensive, and efficient stubble-cutting mechanism which may be permanently attached to a grain-harvesting machine or which may be in the form of an attachment to permit it to be detachably connected to any form of harvesting-machine.

The above and other objects, which will appear as the nature of my invention is better understood, are accomplished by means of the construction illustrated in the accompanying drawings, in which—

Figure 1 is a plan view of a reaper or harvester, showing my invention applied thereto. Fig. 2 is a side elevation of the same. Fig. 3 is a plan view of the attachment removed from the harvester. Fig. 4 is a rear elevation of the same, and Figs. 5 and 6 are vertical detail sectional views taken, respectively, on the lines 5 5 and 6 6 in Fig. 3.

Referring to the drawings by numeral, 1 denotes a self-binding reaper or grain-harvesting machine of any well-known or preferred form and construction, and which, as shown, comprises a main frame 2, supported upon wheels 3 4, the latter of which is a drive or power wheel. Upon the frame 1 is mounted the usual platform 5, at the front of which is the usual cutting apparatus 6, the toothed cutter 7 of which is connected by a pitman 8 to a crank-disk 9 upon a shaft 10, which is mounted in suitable bearings upon one end of the frame 1 and is operatively connected to the drive-wheel 4, as shown.

My stubble-cutting mechanism 11 is here shown in the form of an attachment which is detachably connected to the frame 1, so as to travel over the ground in rear of the harvester. It comprises a frame consisting of a longitudinally-extending portion 12, to the ends of which are connected draw-bars 13, which have their forward ends pivotally mounted and detachably secured upon the frame 1, as shown at 14, or in any other suitable manner. The rear portion of the side bars 13 are arched, as shown at 15, to receive wheels 16, which are adapted to support the attachment. These wheels are adjustably mounted, so that the attachment may be raised and lowered vertically, according to the height at which the stubble is to be cut. This adjustment is effected, as shown, by journaling the wheels 16 in the lower bifurcated end of standards 17, which have their upper ends slidably mounted in guide-openings 18, formed in the arches 15 of the side bars 13 and provided with rack-teeth 19, which are in mesh with the teeth of segmental gears 20. The latter are suitably pivoted, as at 21, and are operated by means of hand-levers 22, which are mounted adjacent to the driver's seat. These levers 22 are connected, by means of links 23, to said segmental gears 20, and they are pivoted, as at 24, upon a segment-rack 26, which is mounted upon a rod or bar 25, which connects the arched portion 15 of the side bars 13. Upon the segmental racks 26 the said levers may be locked by means of the usual spring-seated pawls 27, which are disengaged from the teeth of the segments by means of pivoted handpieces 28, mounted upon the upper ends of said levers.

The cutting apparatus 29 of the attachment is similar to the cutting apparatus 6 of the harvester and comprises a toothed cutter-bar 30, which reciprocates in the toothed guide-frame 12. This frame is pivotally mounted at its ends between the rear lower ends of the side bars 13, as shown at 31, so that its forward edge may be tilted or adjusted vertically to permit the stubble to be cut as close to the ground as desired. This adjustment of the frame or cutting apparatus is preferably effected by means of a hand-lever 32, which is pivotally mounted upon a segment-rack, which is mounted on one of the side bars 13 and connected, by means of the links 33, to the rear portion of the tilting frame 12, as shown at 34. The lever 32 may be locked at any point to hold the cutting apparatus in an adjusted position by the engagement of a pawl 35 upon said lever with a segmental rack 36, provided upon one of the side bars 13. The pawl 35 is spring-seated and may be retracted by operating the usual handpiece 37 upon the outer end of the lever 32. The cutter-bar 30 is reciprocated by a pitman-rod 38, which rod is pivotally connected at one end to the cutter-bar 30 and at its other end is pivoted upon the crank-pin of a crank-disk 39, as shown in Fig. 1. The latter is secured upon one end of a suitably-mounted counter-shaft 40, which has at its opposite end a gear 41, which meshes with a similar gear 42 upon the shaft 10. The shaft 40 is mounted in bearings upon the frame 1 and upon a supporting-bracket 43, which consists of two angularly-disposed bars 44 44', connected together at their outer ends and connected to the frame 1 at their inner ends, as shown at 45 45'.

The construction, use, and advantages of the invention will be readily understood from the foregoing description, taken in connection with the accompanying drawings. It will be seen that when the attachment is applied to a self-binder or grain-harvesting machine of any description the grain may be cut by the cutting apparatus 6 of the machine considerably shorter than is ordinarily done, and the stubble may be cut very close to the ground by the cutting apparatus of the attachment, as will be readily seen upon reference to Fig. 2 of the drawings. The advantages gained by so doing are numerous. There is less straw to pass through the cylinder of the threshing-machine, the land may be more readily turned in plowing, owing to the shortness of the remaining stubble, and the cut portion of the stubble may be burned off of the land when dry, thereby destroying vast quantities of weed seeds and leaving the land in good condition for plowing and also preventing the land from being rendered spongy by the rubbish turned under in plowing. By operating the various levers the attachment may be adjusted so that its cutter will cut as close to the ground as may be desired.

Having thus described my invention, what I claim as new, and desire to secure by Letters Patent, is—

1. The combination with a grain-harvester having a cutting apparatus, of a stubble-cutting attachment mounted thereon and comprising a frame consisting of longitudinal portions, a pivotal connection between said longitudinal portions and said harvester, a supporting-wheel for said attachment, a cutting mechanism upon said attachment, and means for adjusting said wheel to raise and lower said frame.

2. A stubble-cutting attachment consisting of side bars having arched portions, pivotal connections at the free ends of said side bars adapted to be detachably connected to a grain-harvester, standards slidable in the arched portion of said side bars, supporting-wheels journaled upon said standards, means for adjusting said standards, a pivotally-mounted cutter-bar guide, a cutter-bar in said guide, means for locking said guide in an adjusted position, and means for reciprocating said cutter-bar, substantially as described.

3. A stubble-cutting attachment comprising a frame, side bars upon said frame, a grain-harvester, said side bars having their ends pivotally connected to said grain-harvester, said side bars having arched portions, supporting-wheels adjustably mounted upon said arched portions of said side bars, a cutting apparatus pivoted between said side bars to tilt vertically, means for locking said cutting apparatus in adjusted positions, and means for operating said cutting apparatus, substantially as described.

In testimony whereof I have hereunto set my hand in presence of two subscribing witnesses.

JAMES MALCOM GREENSHIELDS.

Witnesses:
 ANDREW B. HOGG,
 ARCHD. R. TINGLEY.